United States Patent
Theimer et al.

(10) Patent No.: US 9,507,147 B2
(45) Date of Patent: Nov. 29, 2016

(54) WEARABLE DISPLAY SYSTEM WITH DETACHED PROJECTOR

(71) Applicant: Research In Motion Limited, Waterloo Ontario (CA)

(72) Inventors: Wolfgang Michael Theimer, Bochum (DE); Klaus-Dieter Meierling, Bochum (DE)

(73) Assignee: BlackBerry Limited, Waterloo, Ontario (CA)

( * ) Notice: Subject to any disclaimer, the term of this patent is extended or adjusted under 35 U.S.C. 154(b) by 652 days.

(21) Appl. No.: 13/767,360

(22) Filed: Feb. 14, 2013

(65) Prior Publication Data

US 2014/0225915 A1     Aug. 14, 2014

(51) Int. Cl.
| | | |
|---|---|---|
| *A61B 1/04* | (2006.01) | |
| *G02B 27/00* | (2006.01) | |
| *G02B 27/01* | (2006.01) | |
| *G06F 3/01* | (2006.01) | |
| *H04N 19/00* | (2014.01) | |
| *H04N 19/53* | (2014.01) | |

(52) U.S. Cl.
CPC ......... *G02B 27/0093* (2013.01); *G02B 27/017* (2013.01); *G06F 3/012* (2013.01); *G02B 27/0081* (2013.01); *G02B 2027/014* (2013.01); *G02B 2027/0187* (2013.01); *H04N 19/00* (2013.01); *H04N 19/006* (2013.01)

(58) Field of Classification Search
CPC ...... H04N 7/18; H04N 13/02; G06T 19/006; G06T 19/00
USPC .......... 345/633, 158; 348/601, 68, 744, 139, 348/169, 722, 42, 94, 95, 143; 356/139.03
See application file for complete search history.

(56) References Cited

U.S. PATENT DOCUMENTS

| | | | |
|---|---|---|---|
| 5,638,208 A | 6/1997 | Walker | |
| 5,889,550 A * | 3/1999 | Reynolds .................. | G01S 5/16 348/139 |

(Continued)

FOREIGN PATENT DOCUMENTS

EP     0977071     2/2000

OTHER PUBLICATIONS

European Search Report dated Oct. 28, 2013 for European Application No. 13155305.

(Continued)

*Primary Examiner* — Michael Lee
*Assistant Examiner* — Omer Khalid
(74) *Attorney, Agent, or Firm* — Jeffrey N. Giunta; Fleit Gibbons Gutman Bongini & Bianco P.L.

(57) ABSTRACT

A display system. A display device has viewports emitting expanded views of an image, an image receiving area receives the image, and optical conduits with exit pupil expanders expand the image through the viewports. A separate tracking projector has an image projector that projects an image along an axis, a marker search illuminator that projects light into a space including the axis, and an image capture component that captures target images that including at least three reflective marker images associated with the image receiving area. An image processor determines, based the marker images, a distance and an orientation of the image receiving area. A projection controller adjusts image data based upon the distance and the orientation to cause projected images to arrive squarely at the image receiving area.

13 Claims, 5 Drawing Sheets

(56) References Cited

U.S. PATENT DOCUMENTS

| | | | |
|---|---|---|---|
| 5,889,625 A | 3/1999 | Chen et al. | |
| 2008/0291342 A1* | 11/2008 | Hirai | H04N 5/74 348/745 |
| 2009/0015799 A1 | 1/2009 | Luciano | |
| 2011/0074837 A1 | 3/2011 | Takeda et al. | |
| 2013/0342572 A1* | 12/2013 | Poulos | G02B 27/017 345/633 |

OTHER PUBLICATIONS

Klepper, S., "Augmented Reality—Display Systems," A survey by Sebastian Klepper, TU Muenchen, Apr. 7, 2007, Sebastian.Klepper@myTUM.de.

FPS, Flexible Picture Systems, Image AnyPlace, Video/Graphics Scaler with Geometry Correction and Optional Edge Blending, www.flexiblepicturesystems.com, Oct. 2008.

* cited by examiner

WEARABLE DISPLAY SYSTEM WITH DETACHED PROJECTOR

FIELD OF THE DISCLOSURE

The present disclosure generally relates to systems including wearable image displays, and more particularly to optical systems that include a wearable component and a detached image projector.

BACKGROUND

Wearable image or video display systems are able to be used to display images that cover a significant portion of a user's field of view, and therefore are able to appear large or are able to present more detail to a user. Some wearable display systems include transparent portions in front of a wearer's eyes that allow ambient scenes, i.e., the view a person would see when the wearable display is not worn, to be viewed by a wearer of the wearable display. Wearable displays that allow ambient scenes to be viewed by a wearer are able to display other images alongside the ambient scenes or images are able to be superimposed on the ambient scene. Such wearable displays include components, such as processing electronics, image generation and projection equipment, and power packs, that increase the bulk and weight of the wearable displays.

Wearable displays that are lighter and less bulky provide enhanced effectiveness for the user.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
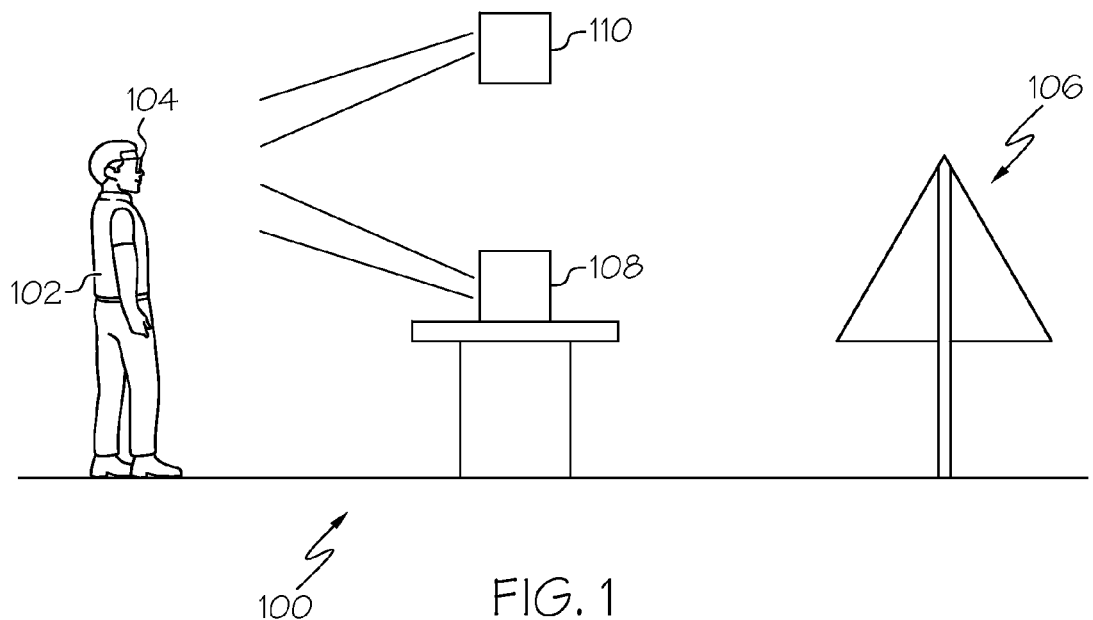
FIG. 1 illustrates operation of a head-mounted augmented reality system, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function. In the following discussion, "handheld" is used to describe items, such as "handheld devices," that are sized, designed and otherwise configured to be carried and operated while being held in a human hand.

The below described systems and methods provide a convenient, easily worn head-mounted display. In one example, a head-mounted component, which in one example has a physical appearance that is similar to a pair of eyeglasses, has one or more image receiving area elements onto which an image is projected from a separate projection device. In one example, the head-mounted component is able to have two viewports that are each optical windows that have an appearance similar to conventional eyeglass lenses but that operate to project the scene received by the image receiving area elements into the wearer's eyes. The one or more image receiving area elements are able to have a size similar to some micro-displays and have dimensions of, e.g., around 1×1 cm.

In one example, the head-mounted component receives an image on the one or more image receiving area and a viewport through which a wearer is able to view an image received bon the image receiving area. In one example, at least one optical conduit that includes an exit pupil expander is used to distribute that image to the optics located in front of the wearer's eyes. The viewport optics located in front of the wearer's eyes in one example also operates as an optical window that passes ambient light through to the eye of the wearer, in a manner similar to normal eyeglass lenses. In one example, the exit pupil expander technology further emits an expanded view of the image received on the image receiving area by, for example, spreading and enlarging the size of the image received by the one or more image receiving area element to the surface area of the viewport in front of the wearer's eyes in order to provide a superposition of the images received by the image receiving area elements over views of the ambient image that are seen through the optics.

A head-mounted component is able to have multiple image receiving areas to support receiving different images to be presented to the wearer. One example of incorporating multiple image receiving areas on a head-mounted display is using two image receiving areas to receive two independent images, with each of the wearer's eye receiving a respective one of the two received independent images. Such a configuration allows a simulated three-dimensional presentation to be viewed by the wearer. In the following discussion, many aspects that refer to a head-mounted component that has a single image receiving area are applicable to examples with multiple image receiving areas on a single head-mounted component.

In contrast to conventional head-mounted displays, the below described head-mounted components of one example do not include hardware to generate the image presented to the wearer. In one example, an image projector, which is a device physically separated from the head-mounted component, generates the image to be viewed and projects the generated image as a projected image to the head-mounted component. In various examples, a smartphone, a portable electronic device, an electronic device located on a desk or mounted on a wall, or any other type of electronic device is able to operate as an image projector. The generated image in one example is projected by scanning each frame of the image, such as in a row by row format, towards one or more image receiving areas of the head-mounted component. In one example, the projected scanning of the image is performed by a deflected laser diode light beam that is emitted into the environment towards the image receiving area element.

Using head-mounted components that do not include the electronics, processing, and image generation components such as display electronics and complex optics, allows a lighter weight and less bulky component to be worn by a user. Such a lighter weight and less bulky head-mounted component is able to be a completely optical and electrically passive device that does not require electrical power to operate. In the following description, an electrically passive device is an optical device that is able to operate without active electronic components. Electrically passive devices are able to include active components for processing unrelated to optical transmission through the device. In further examples, an electrically passive device is able to include active components to process or affect optical transmission but is able to be used without power being consumed by those optical components.

Using an electrically passive head-mounted component obviates the bulk of active components and the batteries or other power packs that may be required to operate the active components. Obviating the bulk and weight of active components and their associated batteries further obviates the inconvenience associated with recharging the power packs and the inconvenience that occurs when the power packs become depleted and thereby render the head-mounted component unusable. Further, electrically passive head-mounted components are able to operate without cables or other connections that are able to provide electrical power, and possibly data, to the head-mounted components. The less bulky, lighter weight electrically passive head-mounted component, which also does not require a power cable to tether the head-mounted component to a power supply, provides a wearer with a very convenient, comfortable and wearable device to view electronically generated images.

The head-mounted apparatus of one example includes components to allow a physically disconnected projector to determine the location and angle of the one or more image receiving areas of the head-mounted component relative to the projection device. In one example, several visual markers are mounted on the head-mounted component that allow a camera or other image capturing device to determine the location and orientation of the head-mounted component. In one example, these visual markers are reflective markers in the form of miniature retroreflectors, such as reflective devices referred to as cataphotes or "cat's eyes," that reflect a light beam back along the path from which it arrives at the retroreflector. In one example, the projector emits an infrared light beam within a defined field of view of the projector. A camera or other sensor on the projector captures images within that defined field of view, and that includes the spectrum of the infrared light beam, to determine if there are reflections from the retroreflectors of a head-mounted component in an image of the scene captured by the camera.

The images of the head-mounted component that are captured by the camera are processed to determine if at least three markers, such as the above described retroreflectors, are detected in the image. Identification of the location of the at least three markers within the image, and the relationship of the location of the image of each marker relative to the images of the other markers, are able to be combined with stored characterizations of the geometry of the location of the markers on the head-mounted device to determine the location and orientation of a plane of one or more image receiving area of the head-mounted display relative to the projector. The orientation of the image receiving area relative to the projector is referred to herein as a "pose angle."

The distance between the projector and the head-mounted element is also able to be determined by processing the captured images to determine the perceived distance between marker images in the captured images relative to the stored characterization of those distances. Based upon this determined orientation and distance, the projector is able to adjust the projected image so that the projected image arrives at the image receiving area of the head-mounted display with the proper size and geometric corrections so as to ensure that the received projection appears "square" and not distorted due to the tilt angle of the head-mounted display and also with the proper size to fill the image receiving area element without overshooting its boundaries.

In one example, the projector is configured to only project images to a head-mounted component when the image receiving area element of the head-mounted component is able to properly receive the image projected by the projector. For example, the projector is configured to only project an image to the head-mounted component when the image receiving area is within a define distance range of a distance threshold from the projector and has an orientation relative to the projector that is not too "tilted," i.e., is within a defined range of an orientation threshold, so as to degrade the received image that is presented to the wearer. For example, when a wearer of the head-mounted component looks "away" from the projector so that the image receiving area is at too oblique of an angle from the projector, the projected image vanishes from the wearer's view and only the unaugmented view of the environment remains visible to the wearer.

In one example, the projector determines the location of a head-mounted component relative to the projector and only projects an image when the head-mounted component is within a defined area relative to the projector. In one example, limiting projecting an image to a head-mounted component that is in a defined area provides privacy by ensuring only one person is able to receive and view the projected images.

Determining the location of the image receiving area of the head-mounted component allows the projector to confine the projection to the location of the image receiving area and to not "overshoot" to the image receiving area. Overshooting the image receiving area refers to a projected image that is larger than the image receiving area, or a projected image that is not completely received by the image receiving area, and thereby causing the projected image to impact other areas of the head-mounted component, the wearer, or other objects other than the image receiving area. Overshooting the image receiving area may cause the bright light of the projection to pass through the optical window viewport, which operates as an eyeglass lens in one example, of the head-mounted component and be viewed as part of the environmental image. Overshoot of the projected image into the optical viewport of the head-mounted component is able to cause the wearer to see a bright light that is projected by the projector, and that is able to affect his or her ability to view the surrounding environment. Limiting the projection of an image by the projector when the image receiving area is in view of the projector further reduces the likelihood that the projector will project an image to another person's eyes or otherwise affect the environment of the projector. Limiting the projection of images to when the image is likely to be received by an image receiving area, such as when the image light collection element has only a small tilt angle relative to the projector and is within a certain distance, also reduces power consumption by the projector, which is advantageous in battery powered projector applications.

In one example, the projector progressively "fades" the image, such as by lowering intensity, resolution, or other aspects of the projected image, as the orientation of the image light collection element relative to the projector changes beyond a threshold. Such progressive fading is able to be regarded by the wearer as a visual feedback mechanism that encourages the wearer to turn his or her head back towards the projector in order to continue to see the projected image.

In one example, the image receiving area elements operates to at least partially block ambient light if no projected image is being received. In one example, ambient light received by the image light collection element is delivered to the eyes of the wearer of the head-mounted component and reduces the contrast of ambient images viewed through the viewport or lenses of the head-mounted element. The head-mounted elements of one example include a light shutter within its optical path, such as within or near the light image collector element, to block light that is not determined to be a projected image. In one example, this shutter is able to include a Liquid Crystal Display (LCD) shutter layer on top of the image receiving area elements that block normal ambient light but pass the projected image. If a determination is made that a projected image is available at the image receiving area element, such as by determining that the light power density is larger than a threshold, the LCD shutter opens to let the projected image through to the optical structure, such as the optical window, that is in front of the wearer's eyes. In one example, an LCD shutter is able to be operated by a miniature solar cell panel built into the HMD. An alternative adds LCD shutters directly to the viewports in front of the wearer's eyes to create variably darkening glasses that attenuate the light being passed by those viewports. Such a structure is able to implement, for example, variably darkening sunglasses that operate to, for example, preserve the contrast ratio between the image of the ambient scene that is viewed through the viewports and the projected image that is superimposed onto the ambient scene image. This is especially helpful if the ambient light is too strong.

FIG. 1 illustrates operation of a head-mounted augmented reality system 100, according to an example. The head-mounted augmented reality system 100 depicts a person 102, referred to below as a "wearer," who is wearing a head-mounted component 104 of an augmented reality system. The head-mounted component 104 is described in further detail below and in one example has an outward appearance resembling an ordinary pair of glasses. The head-mounted component 104 in one example includes viewports that are located on the head-mounted component so as to be located in front of a wearer's eyes. The viewports described below deliver an image to the eye of the wearer, where that image was received from a remote projector. In one example, the viewports further operate as optical windows that pass ambient visible light and allow the wearer to view scenes through the viewport. In the following discussion, the viewports are referred to as lenses in cases where the lens is able to pass ambient light and also in cases where the viewport does not pass ambient light or filters or distorts ambient light that passes through the viewport. In one example, the person 102 is able to view an ambient scene 106 through the viewports, or lenses, of the head-mounted component 104. The head-mounted component 104 of one example further includes exit pupil expanders that operate to superimpose an expanded image of the image that is received from a separate projector onto the ambient scene or image view that is observed by the wearer.

In one example, the head-mounted component 104 includes an image receiving area, which is described in detail below, that is able to receive an image and direct the image to the exit pupil expander for presentation to the view of the person 102. The image receiving area in one example is an area of the head-mounted component 104 onto which an image is projected and the contents of that image are directed the wearer's eyes by exit pupil expanders that are contained in the head-mounted component 104. The image receiving area is able to receive a projected image from an image projector 108, 110. In various examples, the image projector 108,110 is able to consist of or be part of any type of device, such as a portable electronic device serving as the image projector 108 or a facility mounted projector serving as the image projector 110. As described below, the image projector 108, 110 operates to generate and project an image that is properly received by the head-mounted component 104 for presentation to the wearer of the head-mounted component 104.

The image projector 108, 110 in one example includes an image capturing device, as is described in detail below, that captures target images of objects within the view of the camera, such as images of the head-mounted component 104. Based upon processing of the target images, the distance and orientation of the head-mounted component 104 relative to the image projector 108, 110 are determined. In one example, the head-mounted component 104 has visible markers mounted on its surface that operate to create defined image components in captured target images and that facilitate processing of those images to determine the orientation of the head-mounted component 104 relative to the image projector and its distance from the image projector.

Although the described examples include a head-mounted component, any personal display device that allows a person to look into an optical output of an exit pupil expander is able to be configured in a manner similar to that described below. Further examples include personal display devices that are not worn, but may be mounted so as to facilitate a user looking through one or more viewports of the personal display device. The described examples that include head-mounted components refer to a user of that head-mounted component as a wearer. In general, the wearer is a user of the described personal display device, and the term "user" is able to equally refer to the wearer in the below described examples.

Figure 2:
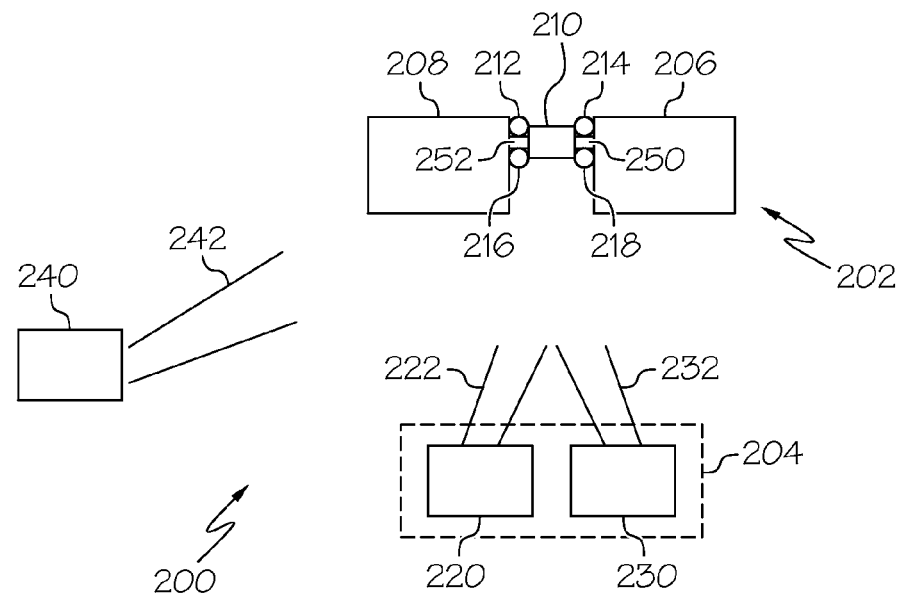
FIG. 2 illustrates a projector and head-mounted component arrangement, according to one example.

FIG. 2 illustrates a projector and head-mounted component arrangement 200, according to one example. The projector and head-mounted component arrangement 200 depicts a head-mounted component 202 and a target tracking projector 204. As described below, this example depicts a head-mounted component 202 that has a shape and configuration similar to a pair of glasses. The illustrated head-mounted component 202 includes two viewports, which are optical windows in the form of a left lens 206 and a right lens 208. In the illustrated example, the left lens 206 is a first viewport that is configured to be positioned in front of a user's first, or left eye, and the right lens 208 a second viewport that is positioned in front of a user's second, or right eye. In one example, the left lens 206 and the right lens 208 are separate viewports that allow a user or wearer wearing the head-mounted component 202 to look through those lenses and observe an ambient image on the other side of those lenses. In a further example, one or both of the left lens 206 and the right lens 208 are able to be configured to not pass light or to be translucent and therefore do not allow a wearer to clearly view an ambient image through those lenses.

One or both of the left lens 206 and the right lens 208 are able to be located in part of the field of view of a wearer such that the wearer is able to unobtrusively view ambient images around that lens. In one example, the head-mounted component includes only one lens through which a wearer is able to look through with only one eye, or alternatively is positioned and sized such that a single lens is in front of both eyes and the wearer looks through the one lens with both eyes. In general, one or more viewports or lenses are able to be mounded on any suitable support that positions the one or more viewports or lenses in front of the wearer's eyes. The one or more viewports or lenses are able to be mounted to a support that is warn on or positioned near a person's head, or the one or more viewports or lenses are able to be mounted on any structure that positions the viewports or lenses close to a person's eyes. The lens or lenses of various examples are able to have neutral optical properties, such as no focus shifting or magnification properties (i.e., they are able to be non-prescription lenses) or one or more lenses are able to have focus shifting, spectral filtering, other optical characteristics, or combinations of these.

The illustrated head-mounted component 202 further includes an image receiving area 210 that receives a projected image. In the illustrated example, the projected image is projected by the target tracking projector 204. The image received by the image receiving area 210 is provided to one or more optical conduit that includes exit pupil expanders to cause the received image to be shown to the user through both the left lens 206 and the right lens 208. The image receiving area 210 is coupled to a left exit pupil expander 250 that includes the left lens 206 and that optically expands the image received on the image receiving area 210 to be viewed through the left lens 206. The image receiving area 210 is also coupled to a right exit pupil expander 252 that includes the right lens 208 and that optically expands the image received on the image receiving area 210 to be viewed through the right lens 208. The image receiving area 210 is described herein as being located in proximity to the left lens 206 and the right lens 208. In this description, the image receiving area 210 is said to be in proximity to the viewports, i.e., the left lens 206 and the right lens 208, by being sufficiently close to the viewports so as to allow an optical conduit that includes an exit pupil expander to couple the viewport or viewports to the image receiving area 210.

Exit pupil expanders are known to practitioners of ordinary skill in the relevant arts and include, in one example, diffractive optical elements or micro-lens arrays to optically expand the area over which the image is emitted to the eye of the wearer through each respective viewport relative to the area of the image received on the image receiving area 210. In one example, the operation of the exit pupil expanders cause the viewports, which include the left lens 206 and the right lens 208 in this example, to emit a respective expanded view of the image received on the image receiving area 210 to each eye of the wearer.

Such an exit pupil expander contained within an optical conduit that operates in conjunction with a viewport is able to comprise a microlens array (MLA) having at least partially reflective properties. The pitch of the MLA may be selected at each position across the viewport of the so as to maintain a ratio of beam size to diffraction order spacing at the viewing plane.

The head-mounted component 202 further includes a number of reflective markers. The illustrated head-mounted component 202 includes a set of four markers that are each a retroreflector, which are sometimes referred to as "cataphotes." Retroreflectors are generally a device or surface that reflects received light back to its source. One example of retroreflectors is referred to as "cat's eyes."

The set of markers depicted on the head-mounted component 202 are four retroreflectors 260 that include a first retroreflector 212, a second retroreflector 214, a third retroreflector 216, and a fourth retroreflector 218. The four illustrated retroreflectors 260 are located on each corner of the square or rectangular image receiving area 210. In general, any type of marker that is able to be sensed by the target tracking projector 204 is able to be mounted on a head-mounted component. Mounting three or more markers at known points of the head-mounted component 202 allows capturing images of the head-mounted component and determining its orientation and distance from the image capturing device. The markers of one example are each disposed in a defined location relative to the image receiving area 210 such that markers all have a defined physical location relationship to the image receiving area 210.

The target tracking projector 204, as is described in detail below, includes components to capture target images of objects within the view of the image capture components, such as the head-mounted component 202. The target tracking projector 204 operates to track the location of the head-mounted component 202 in order to properly project one or more images to image receiving areas of the head mounted components. As described below, the target tracking projector 204 captures target images of the head-mounted component 202 and processes those captured target images to identify and locate images of markers in the captured target image. The determined location of images of markers within the captured target images allows a determination of the location and orientation of the image receiving area 210 relative to the image capturing device that captured the target image. In one example, these determined distances and orientations are used to adjust the projected image to ensure proper reception of the projected image by the image receiving area 210. In one example, at each of least four reflective markers are located at a respective corner of the image receiving area 210. The processor analyzing the captured target images of those at least four reflective markers is then able to determine the location and orientation of these at least four markers, and thereby determine the location and orientation of the four corners of the image receiving area 210, which are collocated with those markers. In such a configuration, a projection controller is able to adjust the image data to create a projected image that extends substantially across an area with corners defined by those four markers, which corresponds to the image receiving area.

The target tracking projector 204 includes an image projector 220 and a camera 230. The cameral 230 is able to capture images within the field of view of the camera 230, which is referred to herein as a "view." The image projector 220 in one example includes a scanning laser light beam emitter that is able to rapidly scan a light beam 222 along an axis that is able to be configured to have various angles relative to the front of the image projector 220. The image projector 220 in one example is able to be controlled to project the laser light beam 222 along an axis that is at a rapidly changing angle, referred to herein as a projection angle, relative to the front of the image projector 220. The image projector 220 is able to project the laser light beam 222 at any angle within a projection angle limit of the image projector 220. The projection angle limit of the image projector 220 in one example corresponds to a field defined by a maximum angle of projection of the laser light beam 222 relative to the front of the image projector 220. In general, the image projector 220 is able to project the laser light beam 222 onto objects within a range of the image projector 220 that are within the view of the camera 230.

The scanned light beam 222 is able to have its intensity modulated as it is scanned at various projection angles so as to project a projected image along an axis by forming a desired image on a surface onto which the scanned light beam is projected. The image projector 220 is further able to operate as a marker search illuminator, and is therefore able to include a marker search illuminator, that projects illuminating light in a search light pattern into a space in front of the light emitter such that markers, such as the above described retroreflectors 260, are illuminated by the illuminating light. The camera 230 in one example is an image capture component is able to capture a target image within a space that consists of a view 232 of an image capture component, such as the camera 230. The view 232 includes a space that includes regions into which the image projector 220 is able to project the laser light beam 222. A target image in this context is any image captured by an image capture component, such as camera 230, that includes images of markers used by a personal display device to which an image is to be projected. As described below, captured target images are able to be analyzed to identify the locations of markers, such as the four retroreflective markers described above, that are mounted on known locations of a head-mounted component.

In one example, the image projector 220, or another light emitter in an alternative example (not shown), is able to project illuminating light by emitting a search light pattern that consists of an infrared light beam that is emitted at various angles to form a search pattern. The infrared light pattern emitted in this example illuminates, and is then reflected by, the four retroreflectors 260. The camera 230 in such an example is configured to capture infrared light reflected by the reflective marker images and produce target images that include a respective image of each reflection of infrared light by each of the markers within the view of the image capture component. The target images are processed to identify reflective marker images of the received infrared reflections captured within the target images. Based on the location of identified reflective marker images within the target images, information indicating the locations of the images of the four retroreflectors 260 relative to each other in each target image is able to be determined. Based upon these determined relationships within the target images, the distance from the retroreflectors to the target tracking projector 204, the projection angle from the tracking projector 204 to the retroreflectors, and the orientation such as the pose angle of the set of retroreflectors relative to the target tracking projector 204 is able to be determined. In an alternative example, a single, broad beam infrared light is able to be constantly or intermittently emitted to illuminate objects in a volume that is in front of the target tracking projector 204. A camera is then able to capture a target image of objects in that volume to determine the reflections from the retroreflectors 260 or other markers in the captured target image. In another alternative example, a scanning illuminator (not shown, but similar to a scanning image projector 220 described above) is able to scan the volume and a simple light sensor is able to detect light from the markers, such as retroreflectors, on the head-mounted component. In that alternative example, the angle at which the scanning illuminator is emitting light at the time of detection of a reflection by a sensor is a determined angle of the reflector from the projector. In one example, the image projector 220 is also able to operate as a scanning illuminator either while projecting images, in a time interval that is separate from a time interval in which images are projected, or both.

Determining the location of each reflector in a target image captured by the camera 230 allows the determination of the projection angle of each marker, such as the above described retroreflector, relative to the face of the projector. An orientation and distance of the head-mounted component 202 relative to the target tracking projector 204 is able to be determined based upon these angles and the known configuration of the reflectors on the head-mounted component 202. Based upon the determined orientation and distance of the head-mounted component 202 relative to the target tracking projector 204, the target tracking projector 204 is able to adjust its projected image so that it is projected onto the image receiving area 210 without distortion, i.e., so that it arrives squarely at the image receiving area 210.

In some examples, a remote image capturing device 240 that is separate from the target tracking projector 204, but that has a known location and viewing angle 242 relative to the target tracking projector 204, is able to be used to determine the distance and orientation of the head-mounted component 202 relative to the target tracking projector 204. In such an example, the distance and orientation of the head-mounted component 202 relative to the remote image capturing device 240 is able to be determined based upon processing of target images captured by the remote image capturing device 240. The distance and orientation of the head-mounted component 202 relative to the target tracking projector 204 is then able to be determined based upon the determined distance and orientation of the head-mounted component 202 and the known physical relationship between the remote image capturing device 240 and the target tracking projector 204.

After determination of the distance and orientation of the head-mounted component 202 and the target tracking projector 204, an image processor within the target tracking projector 204 is able to adjust the projected image so that the image receiving area 210 of the head-mounted component 202 receives a properly oriented image that appears thereon as an undistorted image as though the projection is to be an adjusted image to the head-mounted component 202 that is adjusted so as to cause the projected image to be projected on an image receiving area 210 of the head-mounted component 202.

Figure 3:
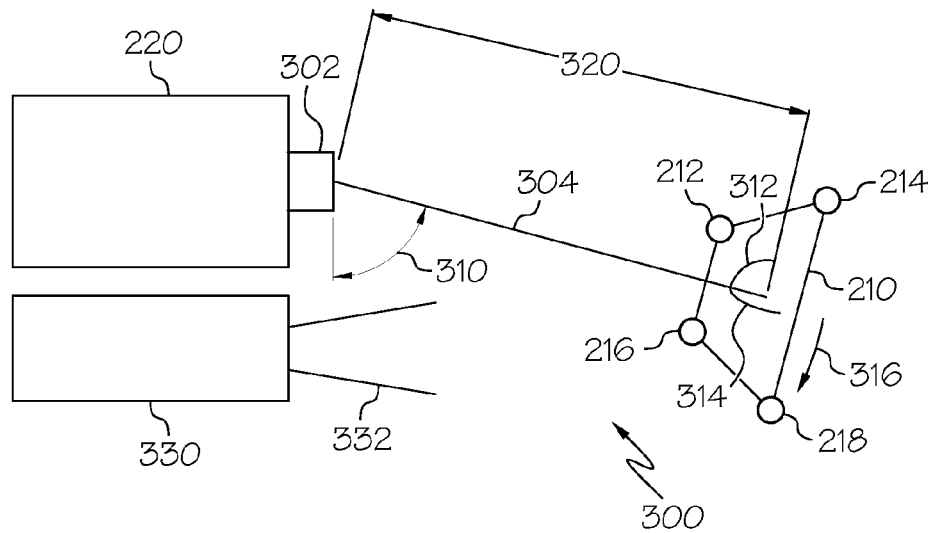
FIG. 3 illustrates projection angles and dimensions diagram for a projection of an image from a projector to a head-mounted component, according to one example.

FIG. 3 illustrates projection angles and dimensions diagram 300 for a projection of an image from a projector to a head-mounted component, according to one example. The projection angles and dimensions diagram 300 depicts a projector 220 and an image receiving area 210 that are similar to the projector 220 and the image receiving area 210 described above. The image receiving area 210 in this example is mounted on the head-mounted component 202, as is described above, and has a rectangular shape with a marker at each corner of that rectangle. In one example, the markers located at each corner of the image receiving area 210 are each a retroreflector, such as the first retroreflector 212, the second retroreflector 214, the third retroreflector 216, and the fourth retroreflector 218 as are described above. In further examples, the image receiving area 210 is able to have three markers or more than four markers mounted with a known relationship to the image receiving area 210. A characterization of the physical relationship of the mounting of the markers relative to each other and to the image receiving area 210 is maintained and stored by processors that process captured target images that contain images of those markers in order to determine the physical relationship between the image receiving area 210 and the camera capturing the image.

The projector 220 in this example projects an image to the image receiving area 210 in the form of a scanning light beam 304. The image receiving area 210 is generally not located directly in front of the projecting lens 302, but is able to be laterally displaced from being directly in front of the projecting lens. In order to direct the light beam 304 to the image receiving area 210, the projector 220 projects the light beam 304 with a projection angle 310 relative to the face of the projecting lens 302. In general, the light beam 304 is scanned, such as in a raster scan pattern, with varying intensity to create the projected image on the image receiving area 210.

The image receiving area 210 is also disposed at an angle, referred to herein as a pose angle, relative to a line that runs between the image receiving area 210 and the projector 220. The pose angle of the image receiving area 210 is shown with three components, a pitch angle 312, a yaw angle 314, and a roll angle 316. The combination of these three angles for a particular orientation of the image receiving area 210 is referred to herein as the pose angle of the image receiving area.

The image projected by the projector 220 is distorted when received on the image receiving area 210 due to the pose angle of the receiving area 210 relative to the face of the projecting lens 302. The size of the image received on the image receiving area is also changed due to the distance 320 between the projector 220 and the image receiving area 210. In order to ensure that the image received on the image receiving area 210 is not affected by these distortions, one example adjusts the image projected by the projector 220 so that the image received by the image receiving area 210 is not distorted. Proper reception of an image on the image receiving area 210 refers to an image that is received as though the image receiving are 210 is perpendicular to a line between the image receiving area 210 and the projector 220, and the center of the image receiving area is aligned with the center of the projecting lens 302. In the following description, an image that is properly received on the image receiving area 210 is said to be squarely received.

The projection angles and dimensions diagram 300 further depicts a camera 330, that captures images within the field of view 332. In the illustrated example, the camera captures target an image that includes the image receiving area 210 and the four markers, where the location of the four markers form a quadrilateral shape in the captured target image. Based upon processing of the target images captured by the camera 330, the location of each image of the four markers within the captured target images is identified. In one example, the angles depicted in the projection angles and dimensions diagram 300, such as the projection angle 310, the pitch angle 312, the yaw angle 314, and the roll angle 316, are determined along with the distance 320 between the projecting lens 302 and the image receiving area 210 based upon determined relationships between the location of each of the four markers relative to each and their location within the image. As is understood by practitioners of ordinary skill in the relevant arts, the length of the sides of the quadrilateral formed by the four markers in the captured target image, and the angles between each pair of these sides, are able to be combined with the known physical configuration of the four markers on the head-mounted component 202 and the relationship between the camera 330 and projector 220 to determine the pose angle of the image receiving area 210 relative to the projector 220 and also a determination of the distance 320 between the projecting lens 302 and the image receiver. The location of the quadrilateral in the captured target image, in combination with knowledge of the physical relationship between the projecting lens 302 and the camera 330 and the determined distance 320, further allows determination of the projection angle 310 that is required to cause the projected image to be projected onto the image receiving area 210.

Figure 4:
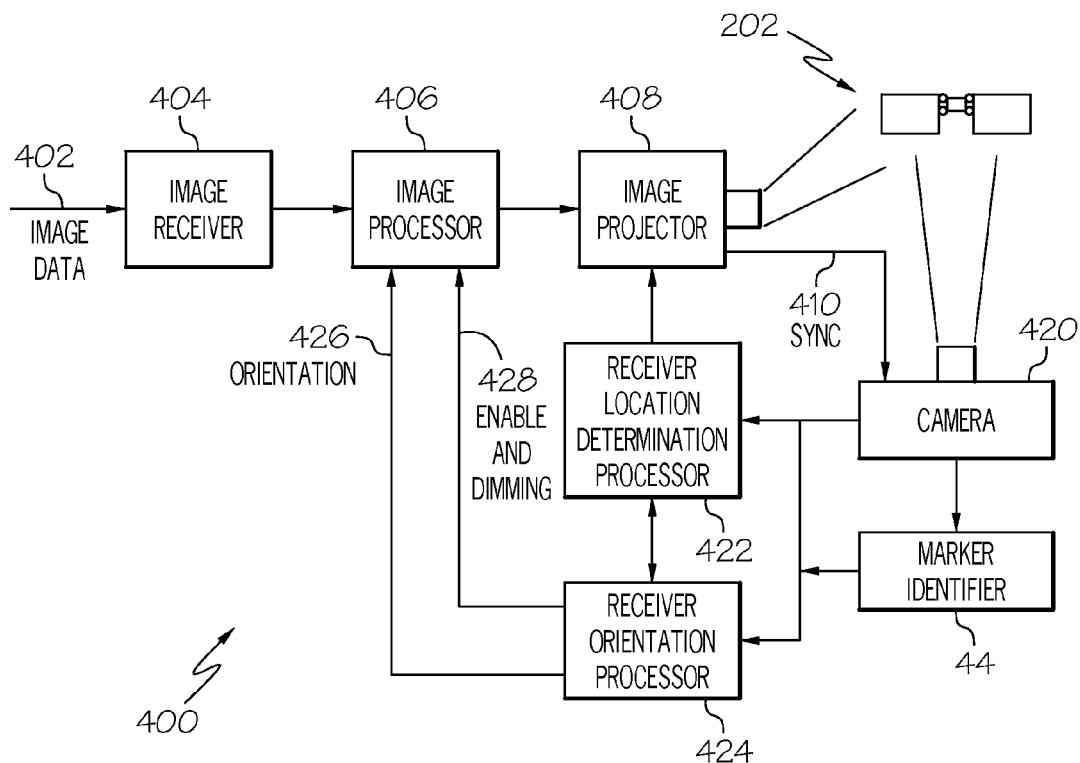
FIG. 4 illustrates a projector block diagram, according to an example.

FIG. 4 illustrates a projector block diagram 400, according to an example. The projector block diagram 400 illustrates components contained within one example of a target tracking projector 204, which is discussed above, that is able to be one of a portable electronic device serving as the image projector 108, a facility mounted projector serving as the image projector 110, or any other projection device. The projector block diagram 400 illustrates the elements of a projector that are particularly relevant to aspects of the systems and methods described herein. It is understood that a particular device including a projector is able to include additional components, such as one or more specialized data communications equipment, data processing equipment, image processing equipment, other components, or combinations of these. In the illustrated example, the projector block diagram 400 depicts components of a projector, such as target tracking projector 204, that projects images to a head-mounted component 202 such as is described above.

The projector block diagram 400 includes an image projector 408 that projects an image to a head-mounted component 202, and a camera 420 that operates to capture an image of a head-mounted component 202. The camera 420 in the illustrated block diagram 400 operates in a manner similar to that described above for the camera 230. Images captured by the camera 420 are processed to identify markers that are affixed to the head-mounted component 202, such as the above described four retroreflectors 260. The images captured by the camera 420 include images of those markers if the head-mounted component 202 is positioned and oriented within a field of view of the camera 420. Based upon processing of the images captured by the camera 420, the projection angle, pose angle and The images captured by camera 420 are provided to a marker identifier 421. The marker identifier 421 processes captured images and identifies images of the markers in those captured images. In the above described example, four markers are placed on the head-mounted component and transmission of an image by the image projector 408 occurs when all four of those markers are visible, and indicate that the location and orientation of the image receiving area 210 is within certain parameters. In one example, the marker identifier 421 identifies the location of markers within the captured images, and determines dimensions of lines within the image that connect those marker to each other and the angles between the connecting lines. In one example, the markers on the head-mounted component 202 are arranged in a rectangle, and the marker identifier 421 determines a quadrilateral that defines a projection of that rectangle onto the viewing angle of the camera 420.

The marker identifier 421 provides data characterizing locations of images of the markers in the captured image to a receiver location determination processor 422 and a receiver orientation processor 424. The location determination processor 422 determines the location of the image receiving area 210 relative to the camera, and thereby determines the location of the image receiving area 210 relative to the projector, based upon the determined location of images of the markers in the captured images and characterizations of the physical relationship between the camera 420 and the image projector 408. The projection angle 310 is then determined based upon the determined locations of the images of the markers in the captured images and the characterization of the relationship between the camera 420 and the image projector 408. The distance 320 between the image projector 408 and the image receiving area 210 is also determined based upon the apparent size of the above described quadrilateral defined by the location of four reflective marker images in the captured image as determined by the marker identifier 421. The determined distance 320 between the image projector 408 and the image receiving area 210 is used to adjust the size of the image projected by the image projector 220 so that a properly sized image is received on the image receiving area 210.

The receiver orientation processor 424 determines the pose of the image receiving area 210 based upon the lengths of the sides of the quadrilateral determined by the marker identifier 421 that is defined by the location of marker images in the captured image and the angles between those sides. The determined pose of the image receiving area 210 in each captured image is provided to the image processor 406, described below, as orientation data 426. The image processor 406 adjusts the image so as to be projected by the image projector 408 such that the projected image is squarely received on the image receiving area 210.

In one example, the receiver orientation processor 424 further determines if the orientation of the image receiving area 210 is within a defined range of an orientation threshold that corresponds to a dimming of the projected image or disabling of projection of the image. The image projector 408 of one example transmits images at full intensity to a head-mounted component 202 if the image receiving area 210 is facing the image projector 408 to within a specified maximum operating pose angle threshold. When the pose angle of the image receiving area 210 is determined to exceed the specified maximum operating pose angle threshold, the image is dimmed in proportion to the amount by which the pose angle exceeds the maximum operating pose angle threshold in order to provide feedback to the wearer that the head-mounted component 202 should be turned back towards the image projector 408, usually by turning his or her head.

In one example, when the pose angle of the image receiving area 210 exceeds a maximum pose angle threshold, which is larger than the maximum operating pose angle threshold, the image displayed to the wearer of the head-mounted component 202 is disabled by, for example, halting projection of the image by the image projector 408. The receiver orientation processor 424 provides enable and dimming data 428 to the image processor 406. The image processor 406 dims or disables the image for projection by the image projector 408 based upon the enable and dimming data 428.

Based upon the above described distance and orientation characteristics of the image receiver area 210 relative to the image projector 408, images are projected by the image projector 408 to the image receiver area 210. The depicted projector block diagram 400 includes an image receiver 404 that is configured to receive image data 402 that is to be projected to the image projection area 210. Image data 402 is able to depict any type of image or data upon which an image is to be created. For example, image data 402 may depict a fixed image that is to be displayed to a user, image data 402 is able to include a time sequence of images that are to be displayed to a user as a movie or other time varying image, image data 402 is able to define data that is to be presented as in image to a user, such as text, numerical data to be displayed as charts or otherwise, or the image data is able to include any type of image data or combinations of these. The image receiver 404 receives the image data 402 and performs any processing of that data in preparation for further processing as is described below.

The image receiver 404 provides image data to an image processor 406. The image processor 406 further receives orientation data 426 and an enable and dimming data 428 from the receiver orientation processor 424. The image receiver 404 adjusts the image data so as to cause the image projector to project an image that arrives squarely at the image receiving area 210. Adjustments performed by the image processor 406 include adjusting the image to be projected to compensate for the pose angle of the image receiving area 210. The image processor 406 further operates to progressively dim the projected image by, for example, lowering the intensity of the image. The image processor 406 in one example further operates to disable projection of the projected image altogether, based upon the enable and dimming data 428.

The adjusted image data produced by the image processor 406 in one example is provided to the image projector 408. The image projector 408 receives receiver location information from the receiver location determination processor 422. In one example, the image projector 408 adjusts the projection angle 310, discussed above, so as to cause the projected image to be directed towards the image receiving area 210.

Figure 5:
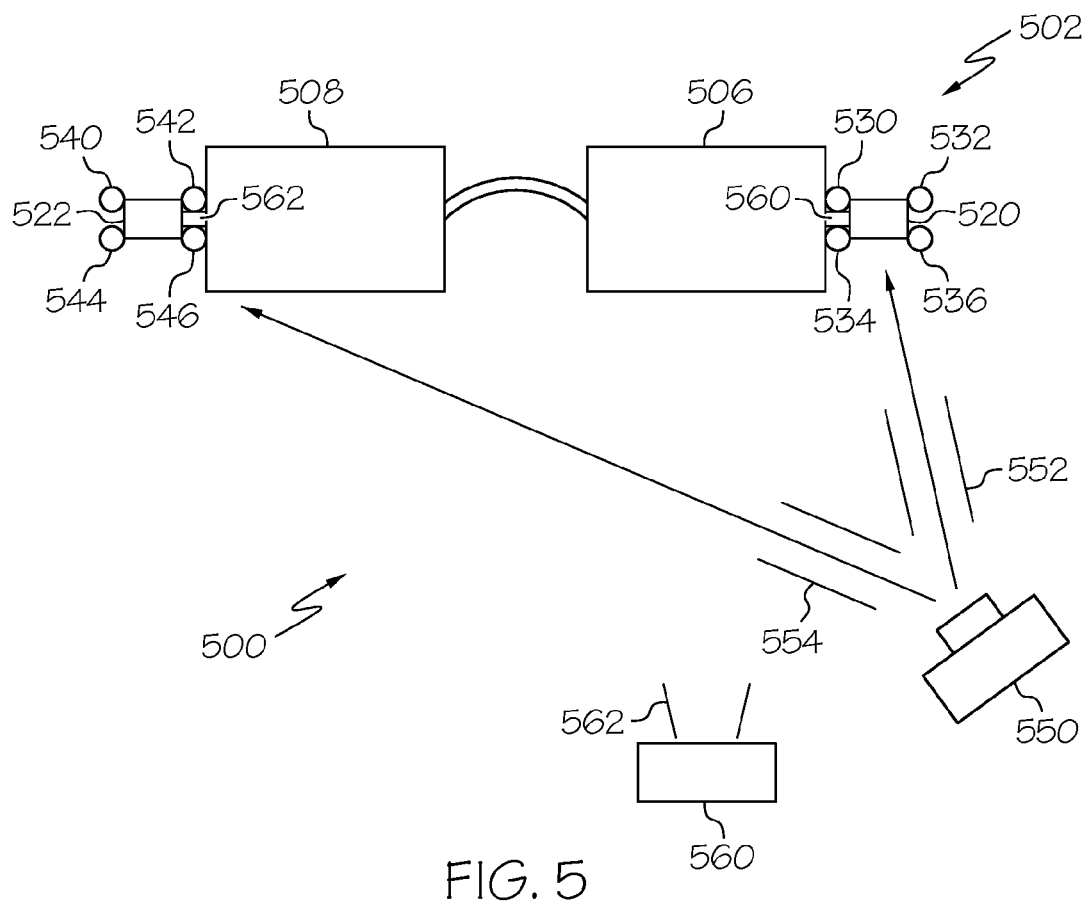
FIG. 5 illustrates a dual image receiving area head-mounted component, in accordance with one example.

FIG. 5 illustrates a dual image receiving area head-mounted component and projector 500, in accordance with one example. The dual image receiving area head-mounted component and projector 500 illustrates a dual image receiving area head-mounted component 502 that is similar to the above described head-mounted component 202, but that has two image receiving areas, a first or left image receiving area 520 and a second or right image receiving area 522 that is separate from the first or left image receiving area 520. The illustrated dual image receiving area head-mounted component 502 has a physical configuration that is similar to eyeglasses, with a left lens 506 and a right lens 508. In this configuration, the left lens 506 is a first viewport that is located on the dual image receiving area head-mounted component 502 so that it is positioned in front of the wearer's left eye when the dual image receiving area head-mounted component 502 is worn. Similarly, the right lens 508 is a second viewport that is separate from the first viewport and positioned to be in front of the wearer's right eye. The dual image receiving area head-mounted component and projector 500 includes at least one optical conduit that include a first optical conduit 560 that configured to optically expand an image received at the first image receiving area as a first respective expanded view of the first viewport, and the at least one optical conduit further comprising a second optical conduit (562) configured to optically expand an image received at the second image receiving area as a second respective expanded view of the second viewport In one example, the left image receiving area 520 is associated with a first optical conduit that includes a first exit pupil expander that optically expands an image received on the left image receiving area 520 such that the image is able to be viewed by a wearer as an expanded view of a first viewport or the left lens 506, thereby causing the image received on the left image receiving area 520 to be directed to the wearer's left eye. The right image receiving area 522 is associated with a second optical conduit that includes a second exit pupil expander that optically expands an image received on the right image receiving area 520 such that the image is able to be viewed by the wearer as an expanded view of the second viewport or the right lens 508, thereby causing the image received on the right image receiving area 522 to be directed to the wearer's right eye. In one example, the left image receiving area 520 and the right image receiving area 522 receive independent images, thereby allowing independent images to be delivered to each of the wearer's left eye and the wearer's right eye. In one example, these two independent images provide the wearer with a simulated three-dimensional view that is created by the different images delivered to each eye.

The dual image receiving area head-mounted component 502 includes two sets of markers, a first set of markers associated with a first, or left image receiving area 520, and a second set of markers associated with a second, or right image receiving area 522. The left image receiving area 520 in this example is a rectangular area that has four markers, with one marker located at each corner of that rectangular area of the left image receiving area 520. The left image receiving area 520 is shown to have a first set of markers that includes a left first marker 530, a left second marker 532, a left third marker 534, and a left fourth marker 536. These four markers are each disposed at respective defined locations relative to the left receiving area 520. The right image receiving are 522 similarly has a second set of four markers with one at each corner of its rectangular outline. The right image receiving area 522 is shown to have the second set of markers that includes a right first marker 540, a right second marker 542, a right third marker 544 and a right fourth marker 546. These four markers are each disposed at respective defined locations relative to the right receiving area 522. These two sets of four markers each define two quadrilaterals that are able to be detected in captured images of the dual image receiving area head-mounted component 502. In one example, each of these markers is a retroreflector that is configured to receive light at any of a range of angles and emit a beam of light along the same angle. Placing markers at each corner of a quadrilateral of the respective image receiving area facilitates image processing by allowing the location of the image receiving area to be calculated by determining the location of the four markers at each corner of the image receiving area, which corresponds to the four corners of the surface to which the projected image or sub-image is to be projected. In further examples, each image receiving area is able to have various number of respective markers disposed in proximity to, or with a fixed relation to, each respective image receiving area. For example, some examples are able to have at least three reflective marker, such as two re The dual image receiving area head-mounted component and projector 500 further depicts a dual image projector 550, which in one example is similar to the above described target tracking projector 204. The dual image projector 550 operates with the dual image receiving area head-mounted component 502 to project respective sub-images to each image receiving area, where each of the respective sub-images are independent of the other. The dual image projector 550 further includes a marker search illuminator that projects illuminating light into the view of a camera 560.

The dual image projector 550 includes a camera 560 that operates to capture target images of objects within a view 562. The camera 560 captures target images that have images of respective reflections of the illuminating light emitted by the search light illuminator that are reflected by respective reflective markers. These captured target images include two sets of reflective marker images, which include images of all of the eight markers within the two groups of four described above. A camera 560 or other sensor associated with the projector captures a target image of the dual image receiving area head-mounted component 502 and identifies a first set of reflector marker images that correspond to the above described first set of markers associated with the first, or left image receiving area 520, and a second set of reflective marker images that correspond to the above described second set of markers associated with the second, or right image receiving area 522. Based upon these two identified sets of reflective marker images, two quadrilaterals are determined that identify the location and pose angle of the two image receiving areas relative to the dual image projector 550. Based on the determined location of images of the first set of markers in the target image, a first distance and a first orientation of the first, or left image receiving area 520 relative to the projector is able to be determined. A second distance and a second orientation of the second, or right image receiving area 522 relative to the projector is also able to be determined based on the determined location of images of the second set of markers in the target image.

The dual image projector 550 of one example is then able to project two sub-images, a first, or left sub-image 552 and a second, or right, sub-image 554, where each sub-image of the two sub-images is projected onto a respective image receiving area of the above described two image receiving areas. In one example, the first or left sub-image 552 is projected to the first, or left image receiving area 520 and the second sub-image 554 is projected to the second, or right, image receiving area 522. In one example, a dual image projector 550 is able to project the two sub-images by, e.g., alternating a projection of each line of each raster scanned sub-image. For example, the dual image projector 550 is able to project a first line of the left sub-image 552, and then project a first line for the right sub-image 554. Following the projection of one line for each sub-image, the dual image projector 550 is then able to return to projecting a second line of the left sub-image 552, followed by the second line of the right sub-image 554.

The dual image projector 550 creates each of these sub-images by adjusting image data based upon the distance and the orientation of the respective image receiving area so as to cause the projected image to arrive squarely at the image receiving area with a defined size. By creating such sub-images, one sub-image is directed to each of the two image receiving areas of the dual image receiving area head-mounted component 502 based upon the location and pose information determined from analysis of the captured target images.

In further examples, markers are mounted on various locations on the dual image receiving area head-mounted component 502. In an alternative example, the dual image receiving area head-mounted component 502 has only four markers, such as the left first marker 530, the left third marker 534, the right second marker 542 and the right fourth marker 546. In further examples, the markers are located at defined positions on the dual image receiving area head-mounted component 502 but not at locations that define edges of one or more receiving areas. In one example, three or more markers are located on the front of the dual image receiving area head-mounted component 502, and characterizations of the locations of the image receiving areas relative to the locations of the markers is stored in device that receives data defining the location of marker images within captured images of the dual image receiving area head-mounted component 502. Based upon the characterization of the location of the image receiving areas relative to the locations of the markers, the processor is able to determine, based on the determining the location of the marker images from processing of target images of the dual image receiving area head-mounted component 502, a first distance and a first orientation of the first, or left image receiving area 520 relative to the projector is able to be determined. The processor is also able to determine a second distance and a second orientation of the second, or right image receiving area 522 relative to the projector. The projected sub-images are thereby able to be correspondingly adjusted based upon the first distance, the first orientation, the second distance and the second orientation to cause the sub-images to be squarely received on each respective image receiving area with a defined size. In one example, the defined size is the size of the respective receiving area for that sub-image.

Figure 6:
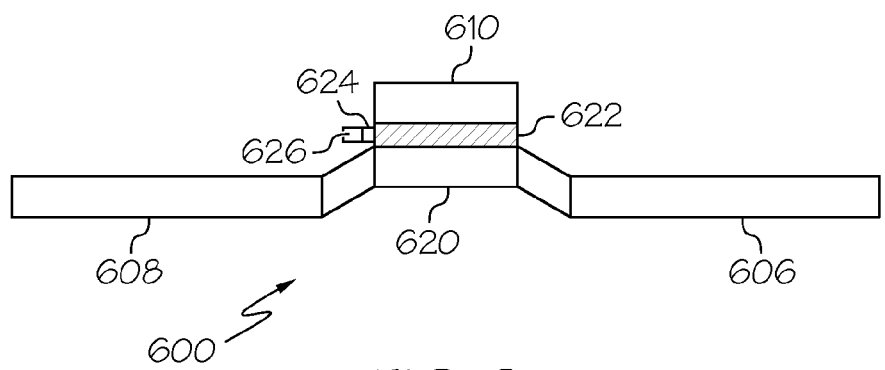
FIG. 6 illustrates a head-mounted component with image receiver shutter, according to one example.

FIG. 6 illustrates a head-mounted component with image receiver shutter 600, according to one example. The head-mounted component with image receiver shutter 600 depicts a top view of a head-mounted component that is similar to the above described head-mounted component 202 but has an image receiver shutter 622 associated with the image receiving area of this example. The head-mounted component with image receiver shutter 600 is shown to have a left lens 606 and a right lens 608 that are similar to the above described left lens 206 and right lens 208. Each of these two viewports, or lenses, include a exit pupil expander that directs images entering a received image entry area 620 in a manner similar to that discussed above with regards to the head-mounted component 202 of FIG. 2.

The head-mounted component with image receiver shutter 600 includes an image receiver shutter 622 that is located between the received image entry area 620 and an image receiving area 610 of this example. The image receiver shutter 622 is configured to block at least a portion of the image conveyed through the optical conduit. In one example, the portion of the image being blocked comprises a portion of the image not being received by the image receiving area. The image receiver shutter 622 is controlled by a controller 624 and operates to block a portion of light being transmitted into the received image entry area 620 when no image is being projected onto at least a portion of the image receiving area 610.

Various techniques are used to control the operation of the image receiver shutter 622. For example, the controller 624 is able to have a scan sensor 626 that detects a light beam emitted by a projector to determine when an image is being sent to the image receiving area 610. In one example, a photo sensor is located within or adjacent to the image receiving area 610 so as to detect the projected image that is received on the image receiving area.

In one example, the projector operates by scanning a light beam across the image receiving area 610 in a raster scanning motion. In such an example, the image receiver shutter 622 consists of a number of Pixel Elements (pixels) that are configured to normally block light transmission from the image receiving area 610 to the received image entry area 620. When the projector is sending a scanning light beam, the scan sensor 626 detects the location of the light beam being received by the image receiving area 610, and the controller operates the image receiver shutter 622 to cause pixels at locations other than the location where the projected scanning light beam is being received to block light transmission, and to cause the pixel at the location where the projected scanning light beam is arriving at the image receiving area 610. The operation of the image receiver shutter 622 in such an example increases the contrast of the received image by blocking ambient light that enters the image receiving area 610 at locations other than where the scanning light beam from the projector is arriving.

Figure 7:
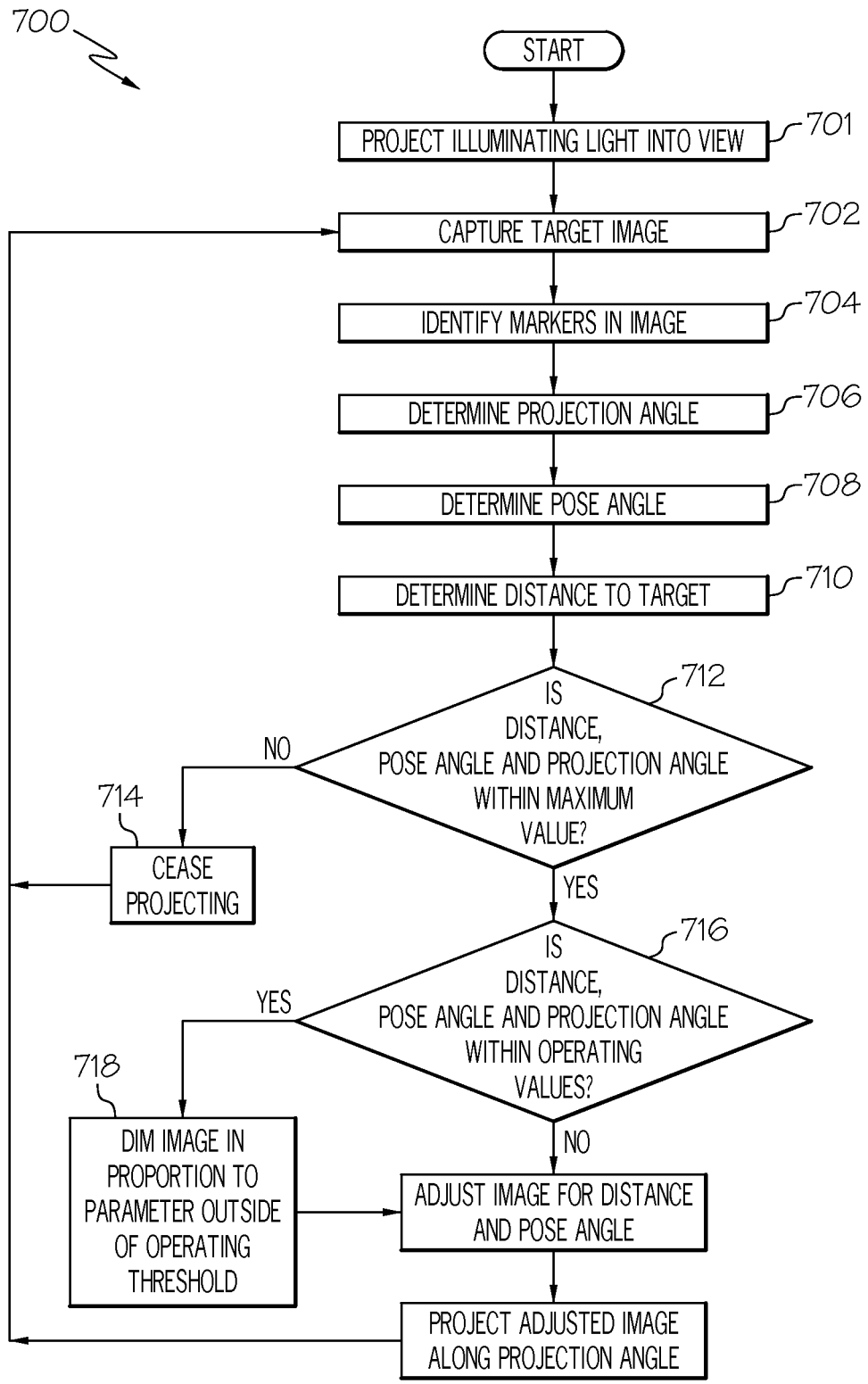
FIG. 7 is an image projection process, according to one example.

FIG. 7 is an image projection process 700, according to one example. The image projection process 700 is performed by a projector, such as the above described target tracking projector 204, that is projecting one or more images to a head-mounted component, such as the head-mounted component 202.

The image projection process 700 begins by projecting, at 701, illuminating light into a view of an image capturing device, such as the camera 230 described above. In one example, the illuminating light is projected by a marker search illuminator that is configured to project the illuminating light into an area that includes the view of the camera or other image capture device that is to capture a target image to be analyzed to determine the location of markers within the area.

The image projection process 700 continues by capturing, at 702, a target image that includes an image of the head-mounted component. The target image in one example is captured by a camera, such as the camera 230 described above. As described above, the image captured by the camera is taken with a view that has a characterized relationship to the projection of an image projector, thereby allowing the captured image to be analyzed to identify the physical relationship between objects in the image and a projector that projects an image. In one example, the capturing of a target image is combined with the projecting of the illuminating light with a marker search illuminator that is configured to project the illuminating light into the view of the camera or other image capture device that captures the target image.

The image projection process 700 continues by identifying, at 704, markers in the captured target image. The identified markers are able to be retroreflectors, as is described above. Identification of markers in the captured target images is described above with regards to the projector block diagram 400.

The image projection process 700 determines, at 706, the projection angle to at least one image receiving area of a head-mounted component associated with the identified markers. With reference to FIG. 3, the projection angle 310 is determined by analyzing the location of markers identified in the captured target image and applying stored characterizations of the physical relationship between the camera view 332 and the projecting lens 302.

The image projection process 700 also determines, at 708, the pose angle of the least one image receiving area of a head-mounted component associated with the identified markers. With reference to FIG. 3, the pose angle is a combination of the pitch angle 312, the yaw angle 314, and the roll angle 316. The pose angle in one example is determined by analyzing the relationship between the location of each of the markers identified in the captured target image and applying stored characterizations of the physical relationship of the mounting of the markers on the head-mounted component to which the markers are mounted.

The image projection process 700 determines, at 710, the distance to the target, e.g., to the image receiving area of a head-mounted component. Referring to FIG. 3, the determined distance corresponds to the distance 320 between the image projector 220 and the image receiving area 210. The above determined parameters of projection angle 310, pose angle and distance are applied to images projected by an image projector to ensure those images are squarely received on the image receiving area 210.

The image projection process 700 determines, at 712, if the distance to the target, such as the image receiving area, pose angle, and projection angle of the image receiving area are within maximum values for those parameters. In one example, a projector operates to only project an image to head-mounted components that are within a defined area in front of the projector, and that have pose angle components that are all within a maximum variation of being perpendicular to a line connecting the projector and the head-mounted display. In one example, each of these parameters is able to have its own respective maximum value. If any of these parameters are in excess of the maximum value for that parameter, the image projection process 700 operates to ceases, at 714, projecting the image.

If the distance to the target, the pose angle, and the projection angle are determined to all be within their maximum value, the image projection process 700 determines at 716, if the distance to the target, pose angle, and projection angle are within maximum operating values for those parameters. In one example, a projector operates to progressively dim, such as by lowering the intensity of, defocusing, or otherwise modifying the projected image, when one or more of these determined parameters, i.e., at least one of the distance and orientation of the image receiving area or the projection angle, are determined to be within a defined respective range of their respective thresholds. In one example, the projected image is dimmed when one or more of the determined parameters exceed its maximum operating value but does not exceed the above described maximum value. Dimming, by defocusing, or otherwise modifying the image, provides a wearer of a head-mounted component with feedback indicating that the user's head should be turned back towards the direction of the projection device. If it is determined that any one or more of the distance to the target, pose angle, and projection angle are not within maximum operating values for those parameters, the image is dimmed, at 718, in proportion to the amount by which the parameter is above its maximum operating value.

If the distance to the target, pose angle, and projection angle are determined to be within maximum values for those parameters, the image is adjusted, at 720, according to the determined distance to the target, pose angle, and projection angle. The adjusted image is then projected, at 722. An image is then captured, at 702, and the image projection process 700 continues as described above.

Figure 8:
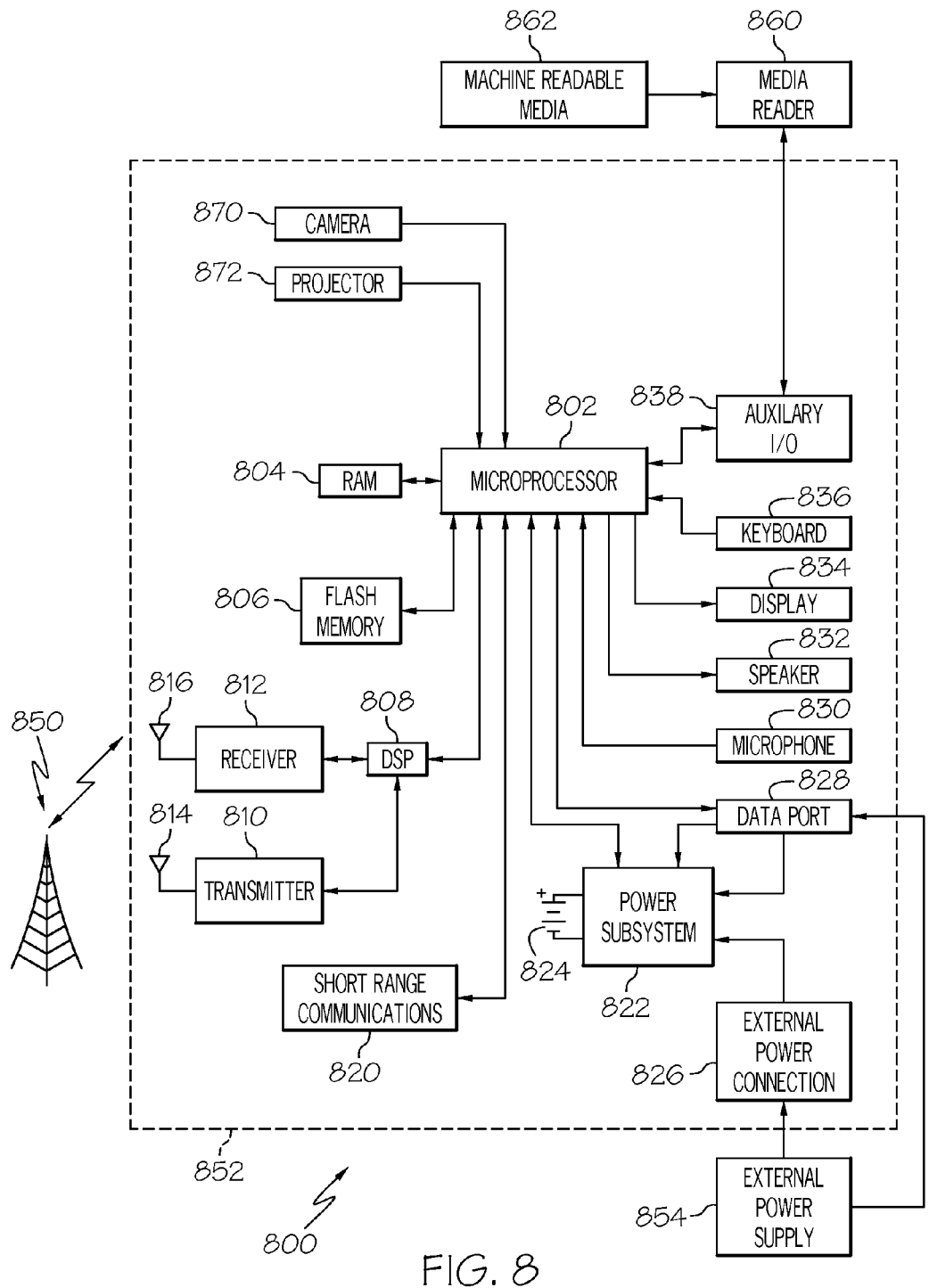
FIG. 8 is a block diagram of an electronic device and associated components in which the systems and methods disclosed herein may be implemented.

FIG. 8 is a block diagram of an electronic device and associated components 800 in which the systems and methods disclosed herein may be implemented. In this example, an electronic device 852 is also a wireless two-way communication device with voice and data communication capabilities. Such electronic devices communicate with a wireless voice or data network 850 using a suitable wireless communications protocol. Wireless voice communications are performed using either an analog or digital wireless communication channel. Data communications allow the electronic device 852 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 852 is an example electronic device that includes two-way wireless communications functions. Such electronic devices incorporate communication subsystem elements such as a wireless transmitter 810, a wireless receiver 812, and associated components such as one or more antenna elements 814 and 816. A digital signal processor (DSP) 808 performs processing to extract data from received wireless signals and to generate signals to be transmitted. The particular design of the communication subsystem is dependent upon the communication network and associated wireless communications protocols with which the device is intended to operate.

The electronic device 852 includes a microprocessor 802 that controls the overall operation of the electronic device 852. The microprocessor 802 interacts with the above described communications subsystem elements and also interacts with other device subsystems such as flash memory 806, random access memory (RAM) 804, auxiliary input/output (I/O) device 838, data port 828, display 834, keyboard 836, speaker 832, microphone 830, a short-range communications subsystem 820, a power subsystem 822, a camera 870, a projector 872, other subsystems, or combinations of these.

One or more power storage or supply elements, such as a battery 824, are connected to a power subsystem 822 to provide power to the circuits of the electronic device 852. The power subsystem 822 includes power distribution circuitry for providing power to the electronic device 852 and also contains battery charging circuitry to manage recharging the battery 824 (or circuitry to replenish power to another power storage element). The power subsystem 822 receives electrical power from external power supply 854. The power subsystem 822 is able to be connected to the external power supply 854 through a dedicated external power connector (not shown) or through power connections within the data port 828. The power subsystem 822 includes a battery monitoring circuit that is operable to provide a status of one or more battery status indicators, such as remaining capacity, temperature, voltage, electrical current consumption, and the like, to various components of the electronic device 852.

The projector 872 is similar in one example to the above described target tracking projector 204. The projector 872 is able to receive image data from the microprocessor 802 and project images defined by that data to, for example, an image receiving area such as the above described image receiving area 210 of the head-mounted component 202. The camera 870, which in one example is equivalent to the above described camera 230, is able to capture images with a view angle that has a known relationship to the projection of the projector 872. The camera 870 provides data defining captured images to the microprocessor 802 for image processing and, for example, identification of images of the markers within the captured image. The microprocessor 802 in one example determines adjustments to be applied to image data that is provided to the projector 872 so as to cause the projected images to be squarely received.

The data port 828 is able to support data communications between the electronic device 852 and other devices through various modes of data communications, such as high speed data transfers over an optical communications circuits. Data port 828 is able to support communications with, for example, an external computer or other device. In some examples, the data port 828 is able to include electrical power connections to provide externally provided electrical power to the electronic device 852, deliver electrical power from the electronic device 852 to other externally connected devices, or both. Data port 828 of, for example, an electronic accessory is able to provide power to an electronic circuit, such as microprocessor 802, and support exchanging data between the microprocessor 802 and a remote electronic device that is connected through the data port 828.

Data communication through data port 828 enables a user to set preferences through the external device or through a software application and extends the capabilities of the device by enabling information or software exchange through direct connections between the electronic device 852 and external data sources rather then via a wireless data communication network. In addition to data communication, the data port 828 provides power to the power subsystem 822 to charge the battery 824 or to supply power to the electronic circuits, such as microprocessor 802, of the electronic device 852.

Operating system software used by the microprocessor 802 is stored in flash memory 806. Further examples are able to use a battery backed-up RAM or other non-volatile storage data elements to store operating systems, other executable programs, or both. The operating system software, device application software, or parts thereof, are able to be temporarily loaded into volatile data storage such as RAM 804. Data received via wireless communication signals or through wired communications are also able to be stored to RAM 804.

The microprocessor 802, in addition to its operating system functions, is able to execute software applications on the electronic device 852. A set of applications that control basic device operations, including at least data and voice communication applications, is able to be installed on the electronic device 852 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 852 through, for example, the wireless network 850, an auxiliary I/O device 838, Data port 828, short-range communications subsystem 820, or any combination of these interfaces. Such applications are then able to be installed by a user in the RAM 804 or a non-volatile store for execution by the microprocessor 802.

In a data communication mode, a received signal such as a text message or web page download is processed by the communication subsystem, including wireless receiver 812 and wireless transmitter 810, and communicated data is provided the microprocessor 802, which is able to further process the received data for output to the display 834, or alternatively, to an auxiliary I/O device 838 or the Data port 828. A user of the electronic device 852 may also compose data items, such as e-mail messages, using the keyboard 836, which is able to include a complete alphanumeric keyboard or a telephone-type keypad, in conjunction with the display 834 and possibly an auxiliary I/O device 838. Such composed items are then able to be transmitted over a communication network through the communication subsystem.

For voice communications, overall operation of the electronic device 852 is substantially similar, except that received signals are generally provided to a speaker 832 and signals for transmission are generally produced by a microphone 830. Alternative voice or audio I/O subsystems, such as a voice message recording subsystem, may also be implemented on the electronic device 852. Although voice or audio signal output is generally accomplished primarily through the speaker 832, the display 834 may also be used to provide an indication of the identity of a calling party, the duration of a voice call, or other voice call related information, for example.

Depending on conditions or statuses of the electronic device 852, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 820 provides for data communication between the electronic device 852 and different systems or devices, which need not necessarily be similar devices. For example, the short-range communications subsystem 820 includes an infrared device and associated circuits and components or a Radio Frequency based communication module such as one supporting Bluetooth® communications, to provide for communication with similarly-enabled systems and devices, including the data file transfer communications described above.

A media reader 860 is able to be connected to an auxiliary I/O device 838 to allow, for example, loading computer readable program code of a computer program product into the electronic device 852 for storage into flash memory 806. One example of a media reader 860 is an optical drive such as a CD/DVD drive, which may be used to store data to and read data from a computer readable medium or storage product such as computer readable storage media 862. Examples of suitable computer readable storage media include optical storage media such as a CD or DVD, magnetic media, or any other suitable data storage device. Media reader 860 is alternatively able to be connected to the electronic device through the Data port 828 or computer readable program code is alternatively able to be provided to the electronic device 852 through the wireless network 850.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A target tracking projector, comprising:
    a marker search illuminator configured to project illuminating light into a view;
    an image capture component configured to capture target images of objects within the view, the target image comprising at least three reflective marker images each comprising a respective image of each reflection of the illuminating light by the at least three reflective markers;
    an image processor configured to process the target images to determine, based upon locations of each of the at least three reflective marker images identified within the target image, a distance from a projection lens, at least one projection angle from the projection lens, and a pose angle of an image receiving area located within the view, the pose angle comprising a pitch angle, a yaw angle, and a roll angle relative to the projection lens,
    wherein the image receiving area comprises a first image receiving area and a second image receiving area that is separate from the first image receiving area,
    wherein the image processor is further configured to process the target images to determine, based upon locations of the at least three reflective marker images, at least
        a first distance and a first orientation of the first image receiving area relative to the projection lens, and
        a second distance and a second orientation of the second image receiving area relative to the projection lens; and
    a projection controller configured to create a projected image by adjusting image data based upon the distance and the pose angle of the image receiving area so as to geometrically correct for the pose angle and cause the projected image to be squarely received at the image receiving area,
    wherein the projection controller is further configured to create a first sub-image and a second sub-image within the projected image,
        the first sub-image being projected to the first image receiving area and created by adjusting image data based upon the first distance and the first orientation of the first image receiving area so as to cause the projected image to arrive squarely at the first image receiving area,
        the second sub-image being projected to the second image receiving area and created by adjusting image data based upon the second distance and the second orientation of the image receiving area so as to cause the projected image to arrive squarely at the second image receiving area; and
    an image projector configured to project the projected image along the at least one projection angle to the image receiving area.

2. The image projector of claim 1, wherein the image projector comprises the marker search illuminator and the image projector further emits the illuminating light.

3. The image projector of claim 1, wherein the image projector emits the illuminating light as an infrared light into the view,
    and wherein the image capture component is further configured to capture infrared light reflected by the at least three reflective marker images.

4. The image projector of claim 1, wherein the target images comprise at least four reflective marker images, each reflective marker image corresponding to a respective reflective marker located at a respective corner of the image receiving area,
    and wherein the projection controller is further configured to adjust the image data to create the projected image so as to extend substantially across an area with corners defined by the at least four reflective markers.

5. The image projector of claim 1, wherein the projection controller is further configured to cease, based on at least one of the distance, the at least one projection angle, and pose angle the pose angle being in excess of a respective threshold, projection of the projected image.

6. The image projector of claim 5, wherein the projection controller is further configured to progressively dim the projected image based on at least one of the distance, the at least one projection angle, and the pose angle being less than the respective threshold and within a defined respective range of the respective threshold.

7. The image projector of claim 1, wherein:
    the target image comprises two sets of reflective marker images, each set of reflective marker images comprising at least three respective reflective marker images each comprising a respective reflection of the illuminating light by a respective reflective marker,
    a first set of reflective marker images within the two sets being associated with the first image receiving area, a second set of reflective marker images with the two sets being associated with a second image receiving area that is separate from the image receiving area;

the image processor is further configured to:

determine the first distance and the first orientation based upon locations of the first set of reflective marker images; and determine the second distance and the second orientation based upon locations of the second set of reflective marker images.

8. A method, comprising:

projecting illuminating light into a view of an image capture component;

capturing target images of objects within the view of the image capture component, the target image comprising at least three reflective marker images each comprising a respective image of each reflection of the illuminating light by the at least three reflective markers;

determining, based upon locations of each of the at least three reflective marker images identified within the target image, a distance from a projector, at least one projection angle from the projector, and a pose angle of an image receiving area, the pose angle comprising a pitch angle, a yaw angle, and a roll angle with respect to the projector, wherein the image receiving area comprises a first image receiving area and a second image receiving area that is separate from the first image receiving area, wherein the determining further comprises determining, based upon locations of the at least three reflective marker images, at least a first distance and a first orientation of the first image receiving area relative to the projector, and a second distance and a second orientation of the second image receiving area relative to the projector;

creating a projected image by adjusting image data based upon the distance and the pose angle of the image receiving area from the projector so as to geometrically correct for the pose angle and cause the projected image to be squarely received at the image receiving area, wherein the creating further comprises creating a first sub-image and a second sub-image within the projected image, the first sub-image being projected to the first image receiving area and created by adjusting image data based upon the first distance and the first orientation of the first image receiving area so as to cause the projected image to arrive squarely at the first image receiving area, the second sub-image being projected to the second image receiving area and created by adjusting image data based upon the second distance and the second orientation of the image receiving area so as to cause the projected image to arrive squarely at the second image receiving area; and projecting the projected image at the at least one projection angle.

9. The method of claim 8, wherein the target images comprise at least four reflective marker images, each reflective marker image corresponding to a respective reflective marker located at a respective corner of the image receiving area, and wherein the creating the projected image further comprises adjusting the image data to create the projected image so as to extend substantially across an area with corners defined by the at least four reflective markers.

10. The method of claim 8, further comprising ceasing, based on at least one of the distance, the at least one projection angle, and the pose angle being in excess of a respective threshold, projection of the projected image.

11. The method of claim 10, further comprising progressively dimming the projected image based on at least one of the distance, the at least one projection angle, and the pose angle being less than the respective threshold and within a defined respective range of the respective threshold.

12. A non-transitory computer readable storage medium having computer readable program code embodied therewith, the computer readable program code comprising instructions for:

projecting illuminating light into a view of an image capture component;

capturing target images of objects within the view of the image capture component, the target image comprising at least three reflective marker images each comprising a respective image of each reflection of the illuminating light by the at least three reflective markers;

determining, based upon locations of each of the at least three reflective marker images identified within the target image, a distance from a projector, at least one projection angle from the projector, and a pose angle of an image receiving area, the pose angle comprising a pitch angle, a yaw angle, and a roll angle with respect to the projector, wherein the image receiving area comprises a first image receiving area and a second image receiving area that is separate from the first image receiving area, wherein the determining further comprises determining, based upon locations of the at least three reflective marker images, at least a first distance and a first orientation of the first image receiving area relative to the projector, and a second distance and a second orientation of the second image receiving area relative to the projector;

creating a projected image by adjusting image data based upon the distance and the pose angle of the image receiving area so as to geometrically correct for the pose angle and cause the projected image to be squarely received at the image receiving area, wherein the creating further comprises creating a first sub-image and a second sub-image within the projected image, the first sub-image being projected to the first image receiving area and created by adjusting image data based upon the first distance and the first orientation of the first image receiving area so as to cause the projected image to arrive squarely at the first image receiving area, and the second sub-image being projected to the second image receiving area and created by adjusting image data based upon the second distance and the second orientation of the image receiving area so as to cause the projected image to arrive squarely at the second image receiving area; and projecting the projected image at the at least one projection angle.

13. The image projector of claim 1, wherein the image capture component is located separately and remotely from the image projector.

* * * * *